United States Patent [19]

Goyarts

[11] Patent Number: 4,771,144

[45] Date of Patent: Sep. 13, 1988

[54] APPARATUS AND PROCESS FOR USING A SELF-ALIGNING BEARING

[75] Inventor: Wynand M. Goyarts, Abingdon, Va.

[73] Assignee: Simmons-Rand Corporation, Briston, Va.

[21] Appl. No.: 43,800

[22] Filed: Apr. 30, 1987

Related U.S. Application Data

[62] Division of Ser. No. 684,943, Dec. 21, 1984, abandoned.

[51] Int. Cl.$^4$ .................. H01H 9/14; H01H 9/30
[52] U.S. Cl. .................. 200/306; 384/206;
29/622; 361/215; 200/340; 200/330
[58] Field of Search .................. 200/306, 302.2, 340,
200/330, 331, 144 R, 148 R, 148 C, 304, 305;
29/622; 361/215; 384/206, 38, 7, 203

[56] References Cited

U.S. PATENT DOCUMENTS

| | | | |
|---|---|---|---|
| 1,562,130 | 11/1925 | Shtzinger | 384/206 X |
| 2,305,482 | 12/1942 | Lester | 200/302.2 X |
| 2,309,281 | 1/1943 | Steele | 384/206 X |
| 3,116,539 | 1/1964 | Evans et al. | 384/206 X |
| 3,236,989 | 2/1966 | Zavertnik et al. | 200/302.2 X |
| 4,207,757 | 6/1980 | Onuma | 384/203 |
| 4,297,556 | 10/1981 | Taylor | 200/330 |
| 4,454,397 | 1/1984 | Kim | 200/330 X |

FOREIGN PATENT DOCUMENTS

| | | | |
|---|---|---|---|
| 1070740 | 1/1980 | Canada | 200/306 |
| 2444994 | 4/1976 | Fed. Rep. of Germany | 200/304 |
| 2020377 | 11/1979 | United Kingdom | 384/206 |

Primary Examiner—Henry J. Recla
Assistant Examiner—Ernest G. Cusick
Attorney, Agent, or Firm—D. W. Tibbott

[57] ABSTRACT

An apparatus and process for using a self-aligning bearing having a ball movably seated in a socket mounted in a wall of an explosion-proof enclosure and slidably receiving a shaft for transferring motion from the outside to the electrical equipment inside of the enclosure. The abutting surfaces between the ball and socket of the bearing and the ball and the shaft have minimum flame path lengths to meet minimum safety requirements for extinguishing electrical arcing passing along such abutting surfaces.

7 Claims, 1 Drawing Sheet

APPARATUS AND PROCESS FOR USING A SELF-ALIGNING BEARING

This is a division of application Ser. No. 684,943 filed Dec. 21, 1984 now abandoned.

This invention relates to outlet connection devices, particularly to connection devices for transferring mechanical motion into explosion-proof enclosures.

In many applications such as where mining equipment is used it is necessary to provide for electrical switching enclosures that are designed to be explosion proof. The switching is usually accomplished by transferring mechanical motion from the outside to the inside of the enclosure. The devices used to transfer motion require certain physical characteristics to ensure that the electrical flashes that occur during switching are not communicated to the atmosphere which may contain explosive mixtures. The equipment presently used in potentially explosive mining conditions generally have costly sealing mechanisms to maintain the required distance of separation, or flame path, between the inside of the enclosure and the atmosphere.

An object of this invention is to provide a connection device using a self-aligning bearing of a type generally available in the art as the central mechanism for the transmission of motion into an explosion proof enclosure. The requirements for preventing external explosions created by the sparking occurring in an enclosure are readily met by providing the required minimum flame path lengths. In addition the flexibility and ease of installation permits mounting the device at any convenient position on an enclosure.

Another object of the invention is to provide a process for using a self-aligning bearing to provide a connection device for transferring motion between the inside and the outside of an explosion-proof enclosure housing electrical equipment and meeting electrical codes requiring a minimum flame path length to extinguish arcing before it reaches the outside of such enclosure.

The advantages of the invention will be apparent from the following description.

Figure 2:
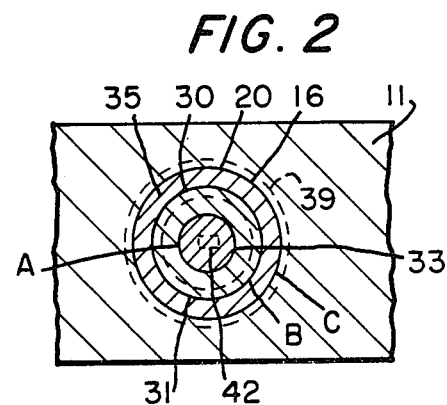
FIG. 2 is a view taken along line 2—2 of FIG. 1.
Figure 1:
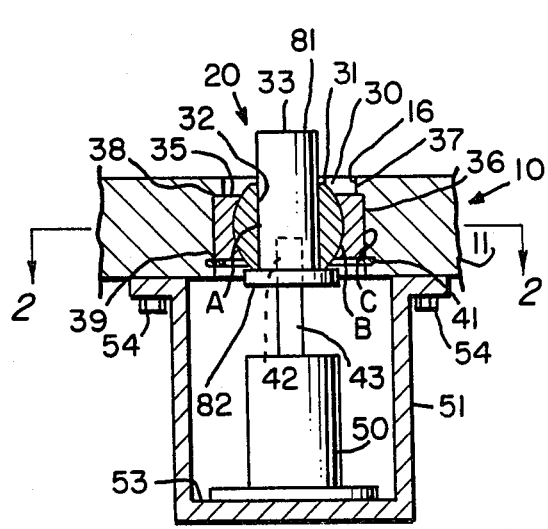
FIG. 1 is a cross-sectional view of an explosion-proof outlet according to this invention.

Referring to FIGS. 1 and 2, an explosion proof enclosure 10 of any type known in the art has a wall 11 with an opening 16 for receiving a motion transfer or enclosure outlet device 20 for transferring rotary motion from outside to inside the enclosure. An electrical assembly includes an enclosure outlet device 20 and a rotary switch 50 is mounted by a frame 51 on the inside of the enclosure and is connected to respond to the rotary motion provided through device 20.

Opening 16 has a configuration adapted to receive a self-aligning bearing 30 of any type known in the art. Such self-aligning bearings are manufactured by and available from several sources for applications in which a bearing surface for a rotating or swiveling shaft is required. These self-aligning bearings are easily positioned to readily transmit mechanical motion. Bearing 30 comprises a spherical ball 31 having an annular opening 32 that is adapted to and receives a shaft 33 in a tightly receiving relationship. Ball 31 is made of brass or steel and rotates in a ball and socket arrangement with an exterior ball retaining joint casing 35 that partially surrounds ball 31. Shaft 33 extends from an upper end 81 outside of the enclosure to a lower end 82 within the enclosure.

Casing 35 is tightly fitted into opening 16 which has a larger cross-sectional area 36 and a narrower cross-sectional area 37 to create a lip 38. A retaining washer 39 inserted in an annular groove 41 maintains the self-aligning bearing structure in place by securing it tightly against lip 30. A slot 42 in shaft 33 is positioned to receive a connecting blade arm 43 from rotary switch 50 at lower end 82. Connecting blade arm 43 extends upwardly from switch 50 and engages slot 42. Switch 50 is mounted on frame 51 along a surface 53 and frame 51 is connected to wall 11 by bolts 54.

In order to meet the standards of explosion proof enclosures, it is necessary that the flame paths between the inside and outside enclosure be certain minimal lengths. These flame paths are the abutting surfaces A, B and C between shaft 33 and ball 31, between ball 31 and casing 35, and between casing 35 and wall 11, respectively. The length can be selected to ensure meeting the required minimum flame path length for an application.

The novel process of the invention is the using of a self-aligning bearing for the connection device and includes the selection of the bearing assembly to have dimensions sufficient to provide a minimum flame path length along said abutting surfaces to extinguish arcing from the inside to the outside of the enclosure when said bearing assembly is mounted in the opening of the enclosure.

In the operation of the switching mechanism shown in FIGS. 1 and 2 the rotary movement of shaft 33 is transferred through blade arm 43 to switch 51.

Figure 3:
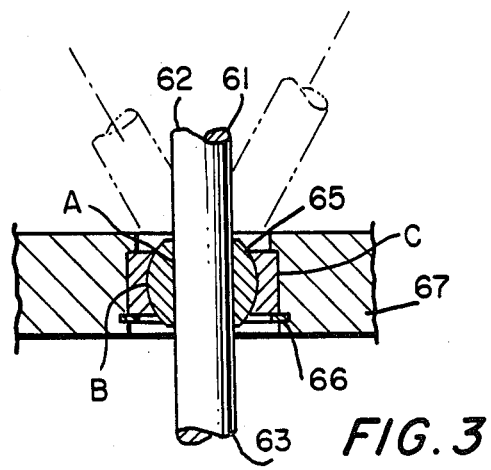
FIGS. 3 and 4 are cross-sectional views of other outlets according to this invention.

Referring to FIG. 3 a mechanism similar to that shown in FIGS. 1 and 2 comprises a shaft 61 with an external end 62 and internal end 63 contained in a self-aligning bearing 65 mounted in a hole 66 in a wall 67 in the same manner as shown in FIG. 1. Movement of end 62 in a joy stick configuration enables transfer of a joy stick movement to end 63 for use by any suitable device.

Figure 4:
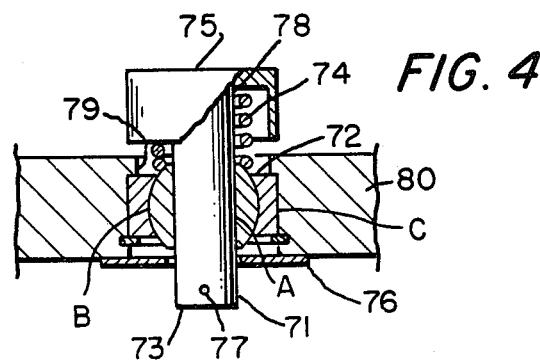

Referring to FIG. 4 a mechanism similar to that shown in FIGS. 1 and 3 has a push button configuration with a shaft 71, a self-aligning bearing 72 mounted in a hole 79 in a wall 80 in the same manner as shown in FIG. 1, an internal end 73, an external end 78, a spring 74, a push button cap 75 attached to the shaft at the external end, and a retaining washer 76 and a pin 77. Push button cap 75 and shaft 71 are biased upwardly by spring 74 acting between cap 75 and bearing 72. Upon depression of push button cap 75 motion is transferred by shaft 71 to a switching mechanism having a push button motion (not shown) in any manner known in the art.

I claim:

1. An explosion-proof electrical enclosure having an outlet connection device for transferring motion from outside to inside the enclosure through an opening in the enclosure comprising:

an enclosure having walls separating the inside of the enclosure from the outside and with one wall having an opening;

a self-aligning bearing having a ball movably mounted in a corresponding socket contained in a casing mounted in the opening in the wall of the enclosure with the ball having an annular opening adapted to receive a shaft;

a shaft having an upper end external of the enclosure and slidably received in the annular opening in the ball of said bearing in a tightly receiving relationship to transfer motion along the shaft;

the abutting surfaces between the ball and its socket and between the annular opening in the ball and the shaft having dimensions measured between the outside and inside of the enclosure sufficient to provide a minimum flame path length able to extinguish arcing along all such abutting surfaces between the outside and inside of the enlosure;

a push button cap attached to the shaft at the external end; and a spring connected between the bearing and the cap to bias the cap and shaft toward the outside.

2. An electrical assembly comprising an enclosure according to claim 1 and an electrical switch inside the enclosure connected to the shaft to receive motion transferred along the shaft.

3. An enclosure outlet connection device for mounting in an opening in a wall of an explosion-proof electrical enclosure for transferring motion from the outside to the inside of the enclosure through the opening in the enclosure comprising:

a self-aligning bearing having a ball movably mounted in a socket provided in a casing and shaped to tightly surround the ball, said casing being mounted in the opening in the wall of the enclosure and said ball having an annular opening to receive a shaft;

a shaft mounted in the annular opening having a first end located external of the enclosure and mounted in the annular opening in a tightly receiving relationship with said shaft being longitudinally movable within the opening;

the abutting surfaces between the ball and its socket and between the annular opening in the ball and the shaft having dimensions measured between the outside and inside of the enclosure sufficient to provide a minimum flame path length able to extinguish arcing along all such abutting surfaces between the outside and inside of the enclosure;

a push button cap attached to the shaft at the first end; and a spring mounted between the bearing and the cap.

4. A device according to claim 3 wherein said spring is mounted in compression to bias the cap away from the ball.

5. An electrical assembly comprising a connection device according to claim 4 wherein said shaft has a second end located within the enclosure and an electrical switch located inside the enclosure connected to the second end of the shaft to receive motion transferred along the shaft.

6. A process of using a self-aligning bearing assembly having a ball movably seated in a socket mounted in an opening in a wall of an enclosure, said enclosure is defined by walls so as to have an inside and an outside and containing electrical equipment which may generate arcing, said ball having an annular opening adapted to receive a shaft within the annular opening, and a shaft in the annular opening in a tightly receiving relationship having a first end external of the enclosure and longitudinally movable in said annular opening, said ball and its socket and said shaft and the annular opening defining abutting surfaces, said process comprising:

selecting said bearing assembly to have dimensions sufficient to provide a minimum flame path length along said abutting surfaces to extinguish arcing from the inside to the outside of the enclosure when said bearing assembly is mounted in the opening of the enclosure;

attaching a button cap to the shaft at the external end;

mounting a spring between the ball and socket and the cap to bias the cap and shaft in a selected direction;

mounting the bearing assembly in the opening in the enclosure for electrical apparatus, and connecting the electrical equipment inside the enclosure to the shaft to receive longitudinal motion transferred along the shaft from outside the enclosure whereby any arcing generated by said electrical equipment is extinguished as it passes along said abutting surfaces.

7. A process of using a self-aligning bearing assembly having a ball movably seated in a socket mounted in an opening in a wall of an enclosure, said enclosure is defined by walls so as to have an inside and an outside and containing electrical equipment which may generate arcing, said ball having an annular opening adapted to receive a shaft within the annular opening, and a shaft in the annular opening in a tightly receiving relationship having a first end external of the enclosure and longitudinally movable in said annular opening, said ball and its socket and said shaft and the annular opening defining abutting surfaces, said process comprising:

selecting said bearing assembly to have a thickness providing a minimum flame path length along all abutting surfaces between the outside and inside of the enclosure when mounted in the opening in the enclosure to extinguish arcing passing along said abutting surfaces;

attaching a button cap to the shaft at the external end;

mounting a spring between the ball and socket and the cap to bias the cap and shaft toward the outside;

mounting the bearing assembly in the opening in the enclosure for electrical apparatus, and connecting the electrical apparatus inside the enclosure to the shaft to receive longitudinal motion transferred along the shaft from outside the enclosure whereby any arcing generated by said electrical equipment is extinguished as it passes along said abutting surfaces.

* * * * *